United States Patent
Ward (10) Patent No.: US 9,331,473 B2
(45) Date of Patent: May 3, 2016

(54) FAULT DETECTING DEVICE FOR AN ELECTRICITY SUPPLY

(71) Applicant: Shakira Limited, Ballinasloe (IE)

(72) Inventor: Patrick Ward, Ballinasloe (IE)

(73) Assignee: Shakira Limited, Ballinasloe (IE)

( * ) Notice: Subject to any disclaimer, the term of this patent is extended or adjusted under 35 U.S.C. 154(b) by 360 days.

(21) Appl. No.: 14/035,540

(22) Filed: Sep. 24, 2013

(65) Prior Publication Data

US 2014/0139956 A1 May 22, 2014

(30) Foreign Application Priority Data

Nov. 16, 2012 (IE) .................................. S2012/0497

(51) Int. Cl.
  *H01H 35/00* (2006.01)
  *H01H 83/00* (2006.01)
  *H02H 3/33* (2006.01)
  *H02H 3/16* (2006.01)

(52) U.S. Cl.
  CPC ............... *H02H 3/335* (2013.01); *H02H 3/167* (2013.01)

(58) Field of Classification Search
  CPC .......... H02H 3/335; H02H 3/167; H02H 3/28

USPC ............................................. 307/116; 361/42
See application file for complete search history.

(56) References Cited

U.S. PATENT DOCUMENTS

2009/0161271 A1* 6/2009 Huang .................... H01H 83/04
  361/42

* cited by examiner

*Primary Examiner* — Carlos Amaya
(74) *Attorney, Agent, or Firm* — Withrow & Terranova, P.L.L.C.

(57) ABSTRACT

A fault detecting device having a plurality of supply conductors, including a first current transformer having a primary winding comprising at least two supply conductors and a secondary winding into which a current is induced in response to a fault current in the primary winding. A fault detection circuit connects the secondary winding to an electromechanical actuator having mechanical contacts in the supply conductors, the fault detection circuit generating an output signal to the actuator when an induced current is detected in the secondary winding, the output signal causing the actuator to open the mechanical contacts. The device further includes a second current transformer having a primary winding connected to an oscillator and a secondary winding comprising at least one supply conductor, the second current transformer arranged to induce an oscillating current into the at least one supply conductor in the event of a fault condition.

9 Claims, 6 Drawing Sheets

FAULT DETECTING DEVICE FOR AN ELECTRICITY SUPPLY

This application claims priority to Irish national application number S2012/0497, filed Nov. 16, 2012, the disclosure of which is incorporated herein by reference in its entirety.

FIELD OF THE DISCLOSURE

This invention relates to a fault detecting device for an electricity supply having a plurality of supply conductors.

BACKGROUND

Figure 1:
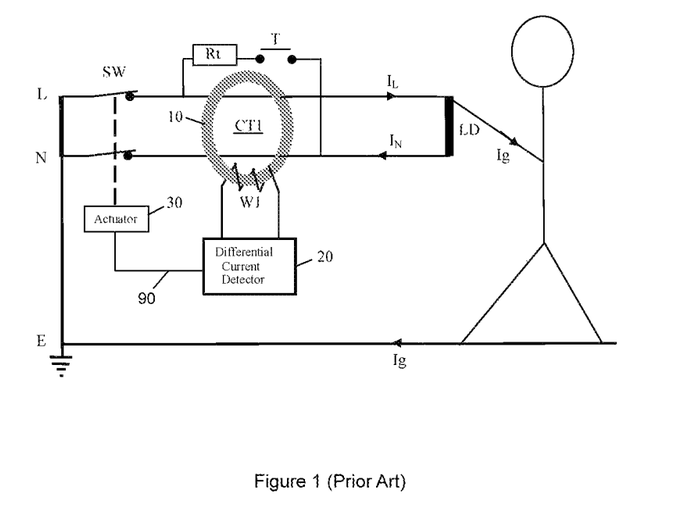
FIGS. 1 to 3 are circuit diagrams illustrating the state of the art.

FIG. 1 is an example of a basic ground fault circuit interrupter (GFCI) for the detection of AC residual currents, also known as a residual current device (RCD). The operation of such circuits is well-known so only a brief description will be given.

A single phase AC mains supply to a load LD comprises live L and neutral N conductors which pass through a toroidal ferromagnetic core 10 of a current transformer CT1. The conductors L, N serve as primary windings of the current transformer CT1 and a winding W1 on the core serves as a secondary winding. In relation to the primary conductors, the term "winding" is used in accordance with conventional terminology, even though these conductors pass directly through the core rather than being wound on it. The neutral conductor N is grounded.

The currents $I_L$ and $I_N$ in the live and neutral conductors L, N flow in opposite directions through the core 10. Thus, under normal conditions, the vector sum of the primary currents $I_L$ and $I_N$ is zero in the absence of an earth fault (residual) current $I_g$ caused by, for example, a person touching the live conductor L. However, the presence of an earth fault current $I_g$ leads to a differential current IΔ in the CT1 primaries, i.e. a non-zero vector sum of the primary currents $I_L$ and $I_N$, which induces a mains frequency current in the secondary winding W1.

The output of the secondary winding W1 is fed to a differential current detector circuit 20. The circuit 20 may be a WA050 RCD integrated circuit (IC) powered from the mains supply (the connections to the mains supply are not shown). The IC 20 is an industry standard RCD IC supplied by Western Automation Research & Development Ltd, Ireland. If IΔ exceeds the operating threshold of the IC 20, the IC 20 will produce an output signal on line 90 which will cause an actuator 30 to open ganged switch contacts SW in the live and neutral conductors L, N to disconnect the mains supply from the load LD. The actuator 30 typically comprises a solenoid-based electromechanical switch, such as a relay, and associated switching circuitry, the current flow through the solenoid either being increased to above a threshold, or reduced to below a threshold, to open the contacts SW, depending on the type of circuit. This is well known.

The GFCI also includes a test circuit connected at one end to the live conductor L upstream of CT1 (upstream means the direction away from the load LD) and at the other end to the neutral conductor N downstream of CT1. The test circuit comprises a resistor Rt connected in series with a normally open test switch T. By momentarily pressing T to close the contacts a part of the live current is diverted to neutral and bypasses the core 10, thereby simulating an earth fault current for detection by the detector circuit 20.

Figure 2:
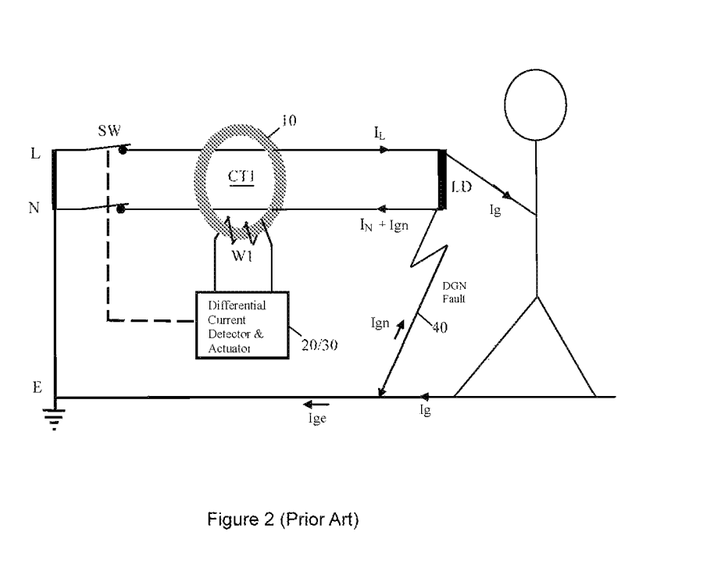

FIG. 2 demonstrates a problem associated with the basic GFCI of FIG. 1. In FIG. 2 the test circuit is present, but is not shown. Also, in FIG. 2 the components 20 and 30 are shown as a single item to avoid overcomplicating the figure.

FIG. 2 shows a ground to neutral fault condition 40 arising from an insulation breakdown between the load side neutral conductor N and ground. Because the neutral is already grounded at the origin of the supply, a second grounding of the neutral at the load is referred to as a DGN fault—double grounded neutral fault. This condition could arise due to miswiring or insulation breakdown. If a person touches a live conductor under a DGN condition a current Ig will flow through the person's body to ground. The fault current Ig will now split into two currents, Ige and Ign, with Ige flowing back to the supply via the earth or ground return path, and Ign returning back to the supply via the DGN fault connection 40 and the neutral conductor N. The ratio or division of these two currents will depend on the impedance of the neutral and ground paths. In many installations, the ground wire could be of smaller cross sectional area than the neutral wire with the result that Ige will be smaller than Ign. In any event, CT1 will no longer see the total fault current and will only see Ige, and if Ige is less than the trip threshold of the GFCI, the device will not trip.

Figure 3:
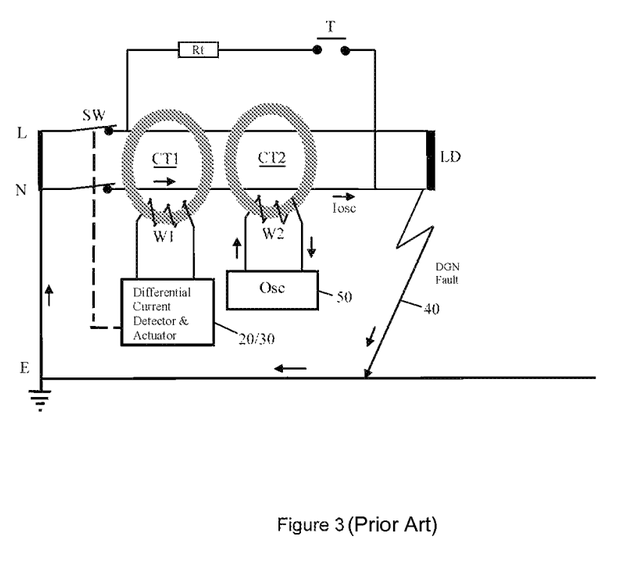

UL943 requires GFCIs to trip automatically or continue to provide protection under a DGN condition. FIG. 3 shows one example of how this can be achieved, but other arrangements are also used in practice.

In the arrangement of FIG. 3, there is a second current transformer, CT2, having a winding W2, similar to the winding W1, on its core. An oscillator circuit 50 is connected to the winding W2 and produces a continuous AC current in the winding W2. Under normal conditions, this current has no effect. However when a DGN fault 40 occurs, a loop is formed by the neutral and earth paths, and a current $I_{osc}$ is induced into this loop, as indicated by the arrows in FIG. 3 (in this case W2 acts as the primary winding and the neutral conductor N the secondary winding). CT1 sees $I_{osc}$ as a differential current in the neutral conductor N which is representative of a ground fault current above the operating threshold of the GFCI. This differential current is detected by the differential current detector 20 which in turn produces an output to the actuator 30 which causes the GFCI to trip contacts SW to open). The DGN detecting circuit can function without an earth fault and without a load connected. CT2 can be referred to as a DGN CT. The oscillator frequency can be set at any value suitable for detection by the detection circuit 20. In a GFCI it is normally set in the low KHz range (e.g. 1-2 Khz) to avoid nuisance tripping at the 6 mA level.

Since the function of CT2 is to induce an oscillatory current into the neutral conductor N, actually the core of CT2 need only surround that conductor. It is shown surrounding both load conductors L and N since the CT assembly is normally commercially supplied as a combined pair, so it is not practical to pass the neutral conductor N alone through one CT and not the other. However, a separate DGN CT could be used, in which case the neutral conductor N alone could be passed through it. This is also the case in FIGS. 4 to 6.

All GFCIs have a test circuit which enables the user to manually test the device. The test circuit, which again comprises a test resistor Rt connected in series with a normally open switch T, is connected at one end to the live conductor L upstream of CT1 and at the other end to the neutral conductor N downstream of CT2. The value of the resistor Rt is selected to generate a test current within the prescribed limits of the product standard, which for a GFCI based on UL943 is 9 mA at rated voltage. When the test switch T is closed, a differential current is caused to flow from live, through Rt and the test switch T to neutral. The test switch and the test resistor have to be rated at full mains supply voltage, and for a single test winding the test resistor may need a power rating of about 1 watt (i.e. 120V×9 m~1 W). These ratings place demands on the components in terms of size, cost and reliability, etc. However, a major problem with conventional GFCI test circuits is that the correct operation of the DGN function is not verified, leaving the user at risk in the event of failure of the DGN detection circuit.

It is the purpose of this invention to avoid or mitigate some or all of the above problems.

SUMMARY

According to the present invention there is provided a fault detecting device for an electricity supply having a plurality of supply conductors, the device including:

a first current transformer (CT1) having a primary winding comprising at least two supply conductors (L, N) and a secondary winding (W1) into which a current is induced in response to a fault current in the primary winding, and a fault detection circuit (20) connecting the secondary winding to an electromechanical actuator (30) having mechanical contacts (SW) in the supply conductors (L, N), the fault detection circuit (20) generating an output signal (90) in response to the detection of an induced current in the secondary winding (W1) indicative of a fault current in the primary winding, the output signal (90) causing the actuator (30) to open the mechanical contacts (SW), the device further including:

a second current transformer (CT2) having a primary winding (W2) connected to an oscillator (50) and a secondary winding comprising at least one supply conductor (N), the second current transformer (CT2) being arranged to induce an oscillating current ($I_{osc}$) into the at least one supply conductor in the event of a fault condition, and a test switch (T) connected between points on one supply conductor ("the test conductor") respectively upstream and downstream of the first and second current transformers (CT1, CT2), wherein when the test switch (T) is closed the oscillating current ($I_{osc}$) flows in a loop comprising the test conductor and the closed test switch (T), the oscillating current ($I_{osc}$) being detectable by the first current transformer (CT1) and fault detecting circuit (20) as a fault current in the primary winding with consequent generation of an output signal (90) from the fault detection circuit (20) and opening of the mechanical contacts (SW).

The test conductor can be the same supply conductor as that forming the secondary winding of the second current transformer (CT2), or a different supply conductor.

Preferably the device further includes a solid state switch (TR1) connected in parallel with the test switch T and a circuit (60) for generating intermittent output signals (100) each of which will turn on the solid state switch (TR1) so that an oscillating current ($I_{osc}$) flows intermittently in a loop comprising the test conductor and the closed solid state switch (TR1), the intermittent oscillating current ($I_{osc}$) being detectable by the first current transformer (CT1) and fault detecting circuit (20) as a fault current in the primary winding with consequent generation of an output signal (90) from the fault detection circuit (20), the mechanical contacts (SW) remaining closed during detection of the intermittent oscillating current ($I_{osc}$).

In such case the mechanical contacts (SW) may remain closed during detection of the intermittent oscillating current ($I_{osc}$) due to inertia in the operation of the actuator (30).

Alternatively, the mechanical contacts (SW) may remain closed during detection of the intermittent oscillating current ($I_{osc}$) due to inhibition of the operation of the actuator (30) by the signal generating circuit (60).

Preferably, too, the device includes an end-of-life (EOL) circuit arranged to output an EOL signal at end of a predetermined response time following setting of said EOL circuit, the appearance of such EOL signal causing the actuator (30) to open the mechanical contacts (SW), the EOL circuit normally being reset by each output signal (90) from the fault detection circuit (20) prior to reaching the end of the response time.

The fault detecting device may be a residual current device.

The electricity supply for the fault detecting device may be AC or DC.

BRIEF DESCRIPTION OF THE DRAWINGS

Embodiments of the invention will now be described, by way of example, with reference to the accompanying drawings, in which.

DETAILED DESCRIPTION

Figure 4:
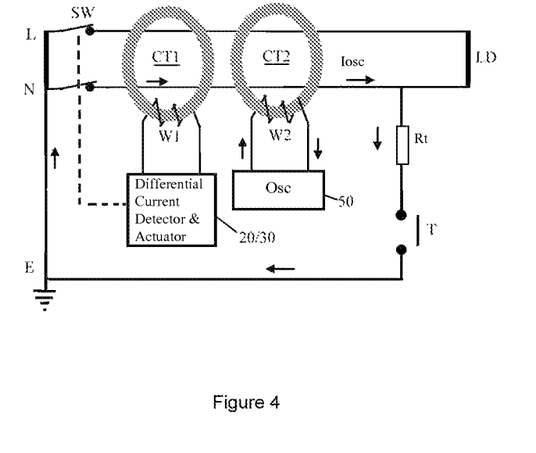
FIGS. 4 to 6 are circuit diagrams of three embodiments of the invention.

FIG. 4 shows a GFCI according to a first embodiment of the invention. In this embodiment the supply N is grounded at the origin of the supply as for a normal TN system. Therefore, the GFCI shown in FIG. 4 is essentially the same as that shown in FIG. 3, and differs only in respect of the location of the test circuit.

The test circuit, which again comprises a test resistor Rt connected in series with a normally open switch T, is in this case connected at both ends to the neutral conductor N, one end upstream of CT1 and the other end downstream of CT2; that is to say, both ends of the test circuit are connected to different points on the same supply conductor, as compared to FIG. 3 where the ends of the test circuit are connected to different supply conductors. When the test switch T is closed the oscillator current flowing in W2 will, as before, induce a current $I_{osc}$ in the neutral conductor N. This will be detected by CT1 and the detector 30 as a differential current, and will be seen as a fault that will cause the contacts SW to be opened in the manner previously described. Resistor Rt can be calibrated to limit the test current to 9 mA limit as previously mentioned, or any suitable value. Whilst a current will flow in the loop formed by closing the test switch T, the voltage in the circuit will be negligible. The combination of a low current at negligible voltage result in low power, so the power rating of resistor Rt can be in the range of few mill watts as opposed to 1 watt or more. The test switch T can also be rated at a low voltage and low current, as convenient.

A major advantage of the arrangement of FIG. 4 is that the correct operation of the DGN circuit (i.e. CT2, W2 and oscillator 50) is verified as well as the RCD circuit (CT1, W1, detector actuator 20/30 and SW), because if any key part of the DGN circuit is not functioning, the test current will not be generated when test switch T is closed and the GFCI will not trip.

It is now a requirement for GFCIs to have a self-test capability and an end-of-life indication in the event of product failure, i.e. an inability of the GFCI to continue to provide protection. The self-test and end-of-life functions can conveniently be referred to as STEOL. An example of a GFCI incorporating STEOL is described in patent application PCT/IB12/51049.

Figure 5:
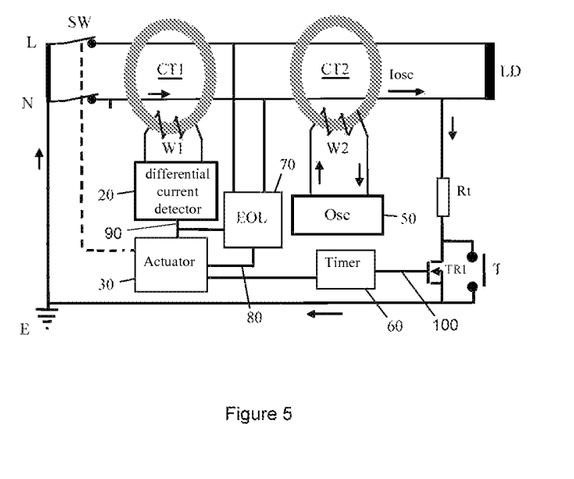

FIG. 5 is an embodiment of the invention which is a modification of FIG. 4 adapted to meet these requirements.

In FIG. 5 the GFCI additionally includes a timer 60 and a field effect transistor TR1 in parallel with the test switch T to provide a self-test (ST) function, and a circuit 70 to provide an end-of-life (EOL) function. The timer 60 produces intermittent output pulses on line 100 at regular intervals, each of which will turn on the field effect transistor TR1 for the duration of the pulse. Each time TR1 turns on it will create a loop in the neutral circuit, similar to that produced by closing test switch T, which will cause a current $I_{osc}$ produced by the oscillator 50 to flow through the loop, as previously described. The differential current thereby passing through the core of CT1 will be of sufficient magnitude to simulate an earth fault current for detection by the detector circuit 20, which produces a resultant output to the actuator 30. However, each time the timer 60 produces a signal to turn on TR1, it also sends an inhibit signal to the actuator 30 to prevent opening of the contacts SW in response to the output from the detector 20. If the actuator 30 is a relay type rather than a solenoid type, it may have sufficient mechanical or magnetic inertia or sluggishness to prevent opening in response to the short duration output produced by the differential current detector 20, and therefore not require the inhibit signal.

The EOL circuit 70 is powered from the live L and neutral N conductors and is designed to produce an output signal on line 80 to the actuator 30 a set response time (the charging cycle) following initial power up of the circuit. The arrival of this signal 80 at the actuator 30 causes the GFCI to trip (i.e. the contacts SW to open) in the same way as an output from the detector circuit 20. However, the response time of the EOL circuit 70 is set to be longer than the period of the output pulses provided by the timer 60, and is preferably a multiple of this interval. Each time the detector circuit 20 successfully produces an output on line 90 caused by closure of TR1 it automatically resets the EOL charging cycle so that the response time is reset to its start point. Thus, when the GFCI is operating correctly, the EOL circuit 70 will always be reset before the end of the response time and no signal will appear on line 80. However, if the differential current detector 20 does not respond with respect to a predetermined number of consecutive signals from the timer 60, the EOL circuit 70 will complete its charging cycle and activate the actuator 30 and cause the GFCI to trip. This will occur each time the GFCI is reset, thus indicating to the user the end-of-life state.

FIGS. 4 and 5 show the neutral supply conductor N connected to earth E. It should be noted that if the earth connection E were omitted from the supply the system, it would then be ungrounded as for an IT system, with the supply conductors being designated L1 and L2 rather than L and N. In this case if either conductor L1 or L2 were inadvertently connected to ground on the supply side of contacts SW, and the load side of that same conductor were subsequently connected to earth, the circuit will behave and respond as for a DGN fault condition in the manner previously described. In that regard, the circuit can be used to detect a double grounding fault in a normally ungrounded supply system.

Figure 6:
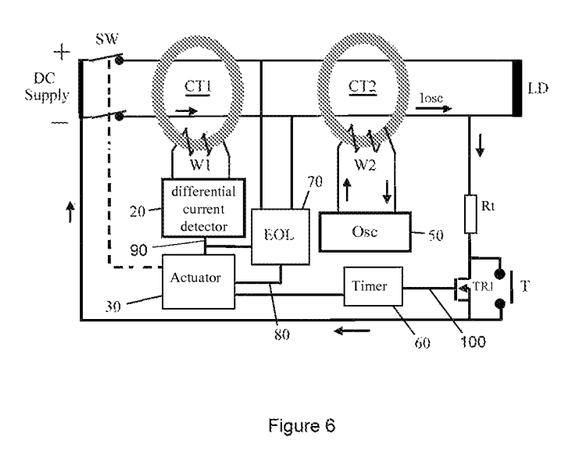

FIG. 6 shows an embodiment of the invention applied to a DC supply system. Components which are equivalent to those shown in FIG. 5 have been given the same reference numerals.

In the arrangement of FIG. 6 the test loop (i.e. the path around which $I_{osc}$ circulates when the test switch T or transistor TR1 is closed) includes the −ve conductor of the DC supply. The detector circuit 20 may be a type that can detect AC and DC currents (known as a B Type RCD in IEC62423), or be a dedicated AC current detector for the purpose of facilitating self-testing and end-of-life indication. Manual testing is achieved as before by closing the test switch T and inducing a current $I_{osc}$ from the oscillator into the −ve conductor, this current being detected by the circuit 20 which activates the actuator 30 and opens the contacts SW as previously described. The self-test also behaves as previously described, and the end-of-life detector also acts as previously described. Also, if the supply side of the +ve or −ve conductor were grounded (whether accidentally or intentionally), subsequent grounding on the load side of that same conductor will cause automatic tripping.

The DC embodiment may be usefully applied to solar panels (PVs) or electric vehicles or electric vehicle charging systems supplying AC or DC to the vehicle.

The invention is applicable to any electricity supply having a grounded supply conductor. Thus the invention could be used on the USA 2-wire (L, N) and 3-wire (L1, L2 & N) systems, and could also be used on a three phase (L1, L2, L3 & N) system. The core of CT2 can surround the neutral conductor N alone or all supply conductors, the neutral being the only grounded conductor.

The invention is not limited to the embodiments described herein which may be modified or varied without departing from the scope of the invention. For example, an LED may be used to indicate the occurrence of each test pulse from the timer 60, and an LED may be used to indicate the end-of-life state. The prospective DGN loop current can be set to enable detection of a DGN condition with a loop impedance up to a certain value, e.g. several ohms.

The invention claimed is:
1. A fault detecting device for an electricity supply having a plurality of supply conductors, the device including:
   a first current transformer having a primary winding comprising at least two supply conductors and a secondary winding into which a current is induced in response to a fault current in the primary winding, and
   a fault detection circuit connecting the secondary winding to an electromechanical actuator having mechanical contacts in the supply conductors, the fault detection circuit generating an output signal to the actuator in response to the detection of an induced current in the secondary winding indicative of a fault current in the primary winding, the output signal causing the actuator to open the mechanical contacts,
   the device further including:
   a second current transformer having a primary winding connected to an oscillator and a secondary winding comprising at least one supply conductor, the second current transformer being arranged to induce an oscillating current into the at least one supply conductor in the event of a fault condition, and
   a test switch connected between a first point on one supply conductor upstream of the first and second current transformers and a second point on the same one supply conductor downstream of the first and second current transformers,
   wherein when the test switch is closed the oscillating current flows in a loop comprising the closed test switch and said one supply conductor to which the closed test switch is connected at said first and second points, the oscillating current being detectable by the first current transformer and fault detecting circuit as a fault current in the primary winding with consequent generation of an output signal from the fault detection circuit and opening of the mechanical contacts.

2. A fault detecting device as claimed in claim 1 wherein said one supply conductor to which the closed test switch is connected is the same supply conductor as that forming the secondary winding of the second current transformer.

3. A fault detecting device as claimed in claim 1 wherein said one supply conductor to which the closed test switch is connected is a different supply conductor to that forming the secondary winding of the second current transformer.

4. A fault detecting device as claimed in claim 1 wherein the device further includes a solid state switch connected in parallel with the test switch and a circuit for generating intermittent output signals each of which is operable to turn on the solid state switch so that an oscillating current flows intermittently in a loop comprising said one supply conductor to which the closed test switch is connected and the closed solid state switch, the intermittent oscillating current being detectable by the first current transformer and fault detecting circuit as a fault current in the primary winding with consequent generation of an output signal from the fault detection circuit, the mechanical contacts remaining closed during detection of the intermittent oscillating current.

5. A fault detecting device as claimed in claim 4 wherein the mechanical contacts remain closed during detection of the intermittent oscillating current due to inertia in the operation of the actuator.

6. A fault detecting device as claimed in claim 4, wherein the mechanical contacts remain closed during detection of the intermittent oscillating current due to inhibition of the operation of the actuator by the signal generating circuit.

7. A fault detecting device as claimed in claim 1 wherein the device further includes an end-of-life (EOL) circuit arranged to output an EOL signal at end of a predetermined response time following setting of said EOL circuit, the appearance of such EOL signal causing the actuator to open the mechanical contacts, the EOL circuit normally being reset by each output signal from the fault detection circuit prior to reaching the end of the response time.

8. A fault detecting device as claimed in claim 1 wherein the fault detecting device is a residual current device.

9. A fault detecting device as claimed in claim 1 wherein the electricity supply for the fault detecting device is either AC or DC.

* * * * *